US008358219B2

(12) United States Patent
Heggen

(10) Patent No.: US 8,358,219 B2
(45) Date of Patent: Jan. 22, 2013

(54) INDICATOR APPARATUS, METHOD OF OPERATION AND ILLUMINATION APPARATUS

(75) Inventor: Dominik Heggen, Paderborn (DE)

(73) Assignee: e: cue control GmbH, Paderborn (DE)

( * ) Notice: Subject to any disclaimer, the term of this patent is extended or adjusted under 35 U.S.C. 154(b) by 345 days.

(21) Appl. No.: 12/700,650

(22) Filed: Feb. 4, 2010

(65) Prior Publication Data

US 2010/0194580 A1 Aug. 5, 2010

(30) Foreign Application Priority Data

Feb. 5, 2009 (DE) ........................ 10 2009 007 504

(51) Int. Cl.

| | |
|---|---|
| ***G08B 5/22*** | (2006.01) |
| ***G08B 21/00*** | (2006.01) |
| ***G08G 1/095*** | (2006.01) |
| ***G09G 3/36*** | (2006.01) |
| ***G05F 1/00*** | (2006.01) |
| ***H04J 9/00*** | (2006.01) |
| ***H04J 3/04*** | (2006.01) |
| ***H04J 3/02*** | (2006.01) |

(52) U.S. Cl. .................. 340/815.45; 340/540; 340/907; 345/102; 323/283; 315/297; 370/205; 370/535; 370/536; 370/542

(58) Field of Classification Search ........................ None
See application file for complete search history.

(56) References Cited

U.S. PATENT DOCUMENTS

| | | | | |
|---|---|---|---|---|
| 3,983,553 | A * | 9/1976 | Kesling | 341/27 |
| 5,479,934 | A * | 1/1996 | Imran | 600/544 |
| 5,803,910 | A * | 9/1998 | Potratz | 600/330 |
| 6,011,467 | A * | 1/2000 | Kamei et al. | 340/540 |
| 6,217,188 | B1 | 4/2001 | Wainwright et al. | |
| 7,129,856 | B2 * | 10/2006 | Hering et al. | 340/907 |
| 7,235,767 | B2 | 6/2007 | Gutbrod et al. | |
| 2005/0269580 | A1 | 12/2005 | D'Angelo | |
| 2006/0261794 | A1 * | 11/2006 | May | 323/283 |
| 2007/0001943 | A1 | 1/2007 | Lee et al. | |
| 2008/0185978 | A1 | 8/2008 | Jeong et al. | |
| 2009/0033612 | A1 * | 2/2009 | Roberts et al. | 345/102 |

FOREIGN PATENT DOCUMENTS

| | | |
|---|---|---|
| DE | 298 16 331 | 1/1999 |
| DE | 10 2004 003 698 | 8/2005 |
| DE | 10 2005 059 067 | 6/2007 |
| DE | 10 2007 017 335 | 10/2008 |
| DE | 10 2007 040 111 | 10/2008 |
| EP | 1 981 147 | 4/2008 |
| WO | WO 2009/027129 | 3/2009 |

* cited by examiner

*Primary Examiner* — George Bugg
*Assistant Examiner* — Renee Dorsey
(74) *Attorney, Agent, or Firm* — Cozen O'Connor

(57) ABSTRACT

An indicator apparatus, having a pulse width modulation circuit (1), a demultiplexer (2) which has at least one signal input (21) and at least two signal outputs (22), wherein the signal input (21) is connected to the pulse width modulation circuit (1), and at least two light-emitting diodes (3) which are each connected to a signal output (22) of the demultiplexer.

13 Claims, 2 Drawing Sheets

INDICATOR APPARATUS, METHOD OF OPERATION AND ILLUMINATION APPARATUS

RELATED APPLICATIONS

This application claims the priority of German application no. 10 2009 007 504.6 filed Feb. 5, 2009, the entire content of which is hereby incorporated by reference.

FIELD OF THE INVENTION

The invention is related to an indicator apparatus, a method for operating such an indicator apparatus, and an illumination apparatus having such an indicator apparatus and having at least one lamp.

SUMMARY OF THE INVENTION

An object of the present invention is to provide an indicator apparatus which can be operated in a particularly power-saving fashion. A further object is to provide a particularly power-saving method for operating an indicator apparatus.

By way of example, the indicator apparatus can be used to indicate the operating state of a connected appliance. In this case, the indicator apparatus may be part of an operator control apparatus which the user can use to operate and control the appliance.

In line with one embodiment of the indicator apparatus, the indicator apparatus comprises a pulse width modulation circuit. The pulse width modulation circuit produces a pulse-width-modulated signal. The pulse-width-modulated signal has a switched-on time, in which a connected appliance is supplied with current by the pulse width modulation circuit, and a switched-off time, during which the connected appliance is not supplied with a current, for example.

In line with one embodiment of the indicator apparatus, the indicator apparatus has a demultiplexer. The demultiplexer comprises at least one signal input and at least two signal outputs. By way of example, the demultiplexer comprises precisely one signal input and a multiplicity of signal outputs. In each and every case, the demultiplexer comprises more signal outputs than signal inputs. The demultiplexer is used to connect an input signal to precisely one of a plurality of outputs.

In line with one embodiment of the indicator apparatus, the demultiplexer has its signal input connected to the pulse width modulation circuit. That is to say that the pulse-width-modulated signal produced by the pulse width modulation circuit is impressed into the demultiplexer via the signal input.

In line with one embodiment of the indicator apparatus, the indicator apparatus comprises at least two light-emitting diodes which are respectively connected to a signal output of the demultiplexer. That is to say that the light-emitting diodes are supplied with operating current by the demultiplexer. The demultiplexer connects the input signal from the pulse width modulation circuit to one of the signal outputs which is connected to a light-emitting diode. In this way, this light-emitting diode is then supplied with current by means of the pulse-width-modulated signal.

In line with one embodiment of the indicator apparatus, the indicator apparatus comprises a pulse width modulation circuit and a demultiplexer which has at least one signal input and at least two signal outputs, wherein the signal input is connected to the pulse width modulation circuit. In addition, the indicator apparatus comprises at least two light-emitting diodes which are respectively connected to a signal output of the demultiplexer.

In this arrangement, the indicator apparatus described here makes use of the following idea, inter alia: an indicator apparatus which is intended to indicate the operating state of a plurality of connected appliances, for example, may have a multiplicity of light-emitting diodes for the purpose of indicating the operating state. If all light-emitting diodes in the indicator apparatus are now supplied with current simultaneously, the indicator apparatus has a relatively high power consumption.

The indicator apparatus described here is now based on the insight, inter alia, that—on account of the inertia of the human eye—the light-emitting diodes in the indicator apparatus do not necessarily need to be operated simultaneously in order to give the observer the impression that they are on at the same time. On the contrary, it is sufficient to operate just one of the light-emitting diodes in each case, while the remaining light-emitting diodes are not supplied with current.

If the light-emitting diodes in the indicator apparatus are individually operated alternately and the light-emitting diodes are operated in rapid succession, the observer is given the impression that all light-emitting diodes in the indicator apparatus are on at the same time. However, since just one light-emitting diode is actually on in each case, the power consumption is reduced to one n-th of the power consumption which the indicator apparatus would have if all light-emitting diodes were operated simultaneously, n being the number of light-emitting diodes in the indicator apparatus.

In line with one embodiment of the indicator apparatus, the demultiplexer has a control input which is connected to a control input of the pulse width modulation circuit. The connection of demultiplexer and pulse width modulation circuit can be used to synchronize the demultiplexer and the pulse width modulation circuit to one another. By way of example, this makes it possible to ensure that each light-emitting diode in the indicator apparatus is operated with the pulse-width-modulated signal which is intended for it. In addition, it is possible to ensure that the demultiplexer switches from one signal output to the next, that is to say from one light-emitting diode to the next, in the switched-off time of the pulse-width-modulated signal. This makes it possible to avoid disagreeable flashes of light when the light-emitting diodes are switched on.

In line with one embodiment of the indicator apparatus, each of the light-emitting diodes in the indicator apparatus comprises at least two light-emitting-diode chips. By way of example, each light-emitting diode comprises a light-emitting-diode chip which emits red light, a light-emitting-diode chip which emits green light and a light-emitting-diode chip which emits blue light. In this case, each light-emitting-diode chip is uniquely connected to a signal output of the demultiplexer. That is to say that each signal output of the demultiplexer has precisely one light-emitting-diode chip associated with it in this embodiment, and each light-emitting-diode chip has precisely one signal output of the demultiplexer associated with it. In this way, it is possible for the light-emitting-diode chips of a light-emitting diode to be operated independently of one another. By way of example, it is thus possible to use RGB light-emitting diodes to set a particular color point for the light produced by the light-emitting diode.

In line with one embodiment of the indicator apparatus, the power consumption of the indicator apparatus is no more than 0.5 W. In this case, the indicator apparatus comprises eight or more light-emitting diodes. This is made possible particularly by virtue of the light-emitting diodes in the indicator apparatus being operated not simultaneously but rather sequentially.

In addition, one aspect of the invention is directed to a method for operating an indicator apparatus which has at least two light-emitting diodes. The indicator apparatus may be an indicator apparatus as described here, for example. That is to say that all features described in connection with the indicator apparatus are also disclosed in connection with the method for operating an indicator apparatus, and vice versa.

In line with one embodiment of the method, the method has a method step according to which a pulse-width-modulated signal is produced which has a switched-on time and a switched-off time. In particular, the pulse-width-modulated signal has a multiplicity of switched-on times and switched-off times, which are periodically successive, for example.

By way of example, the at least two light-emitting diodes are operated by means of the pulse-width-modulated signal.

In the switched-on time, one of the light-emitting diodes is then supplied with current with a forward bias, and in the switched-off time, the light-emitting diode is not supplied with current, or it is supplied with current at a low current level with a reverse bias. In this case, the pulse-width-modulated signal is produced by means of a pulse width modulation circuit.

In line with one embodiment of the method, the method comprises the method step according to which the pulse-width-modulated signal is routed to a demultiplexer. By way of example, to this end a signal output of the pulse width modulation circuit is connected to a signal input of the demultiplexer.

In line with one embodiment of the method, the method comprises a method step in which the pulse width modulation circuit and the demultiplexer are synchronized such that the pulse-width-modulated signal is routed from the demultiplexer to one light-emitting diode of the at least two light-emitting diodes during a switched-off time. That is to say that the demultiplexer turns on the light-emitting diodes of the indicator apparatus sequentially, for example, and connects them to a respective one of its signal outputs. In this case, the switching from one light-emitting diode to another light-emitting diode is preferably effected during the switched-off time of the pulse-width-modulated signal. In this way, it is possible to avoid disagreeable flashes of light when switching from one light-emitting diode to the next.

That is to say that, in line with one embodiment of the method, no flashes of light occur between switching from one light-emitting diode to the next light-emitting diode. The next light-emitting diode is not switched on by the pulse-width-modulated signal until a time after the switching, and not during the switching from the previous light-emitting diode to the next light-emitting diode.

In line with one embodiment of the method for operating an indicator apparatus which comprises at least two light-emitting diodes, the method comprises the following steps, particularly in the following order:

a pulse-width-modulated signal, which has a switched-on time and a switched-off time, is produced by means of a pulse width modulation circuit, the pulse-width-modulated signal is routed to a demultiplexer, pulse width modulation circuit and demultiplexer are synchronized, so that the pulse-width-modulated signal is routed from the demultiplexer to one light-emitting diode of the at least two light-emitting diodes during a switched-off time.

In line with one embodiment of the method, at least one of the light-emitting diodes has at least two light-emitting-diode chips. By way of example, all light-emitting diodes in the indicator apparatus are what are known as RGB light-emitting diodes, which each comprise a light-emitting-diode chip which emits red light, a light-emitting-diode chip which emits blue light and a light-emitting-diode chip which emits green light. For each light-emitting-diode chip, a pulse-width-modulated signal is routed to the light-emitting diode. In this case, it is possible for a pulse-width-modulated signal to be supplied to each light-emitting-diode chip of the light-emitting diode simultaneously, so that the light-emitting-diode chips of a light-emitting diode are operated simultaneously. In this case, the pulse width modulation circuit is suitable for simultaneously producing three different pulse-width-modulated signals, for example. When switching from one light-emitting diode to the next light-emitting diode, the three pulse-width-modulated signals are then applied from three first signal outputs of the demultiplexer to three second signal outputs of the demultiplexer.

Alternatively, it is also possible for the light-emitting-diode chips of the light-emitting diode to be operated sequentially. That is to say that the demultiplexer switches not only between the individual light-emitting diodes but also between the individual light-emitting-diode chips. In this way, the indicator apparatus can be operated in particularly power-saving fashion, since only a single light-emitting-diode chip is ever supplied with current at a particular time.

In line with one embodiment of the method, the pulse-width-modulated signal is routed from the demultiplexer sequentially to the at least two light-emitting diodes. That is to say that the light-emitting diodes in the indicator apparatus are individually operated in succession; none of the fight-emitting diodes in the indicator apparatus is operated at the same time as another light-emitting diode in the indicator apparatus. In this case, as just stated, it is also possible for the light-emitting-diode chips of the light-emitting diodes likewise to be operated individually.

In line with one embodiment of the method, the light-emitting-diode chips of the at least two light-emitting diodes in the indicator apparatus are each operated at the maximum permissible current level during the switched-on time of the pulse-width-modulated signal. On account of the sequential operation of the light-emitting diodes and/or of the light-emitting-diode chips in the indicator apparatus, the light produced by the light-emitting diodes appears less bright overall than when all light-emitting diodes are operated simultaneously.

To compensate for this difference in brightness, the light-emitting diodes are operated at their maximum permissible current level during the short time for which they are operated. Since the light-emitting diodes or the light-emitting-diode chips are always operated only for a short time, the life of the light-emitting diodes is adversely affected thereby scarcely or not at all. On the other hand, the loss of brightness on account of the sequential operation can be compensated for by this measure to such a degree that the observer can barely detect a decrease in brightness.

Another aspect of the invention is directed to an illumination apparatus and an indicator apparatus. Preferably, this is an indicator apparatus as described here, which means that all features described in connection with the indicator apparatus are also disclosed in connection with the illumination apparatus.

The illumination apparatus comprises not only the indicator apparatus but also at least one lamp which is connected to the indicator apparatus, said indicator apparatus being provided for the purpose of indicating an operating state for the at least one lamp. In this case, it is possible for the indicator apparatus to indicate the following properties of the light produced by the lamp, for example: color point, color temperature and/or brightness.

BRIEF DESCRIPTION OF THE DRAWINGS

The indicator apparatus described here, the method described here for operating an indicator apparatus and also the illumination apparatus described here will be explained in more detail below with reference to exemplary embodiments and to the associated figures.

DETAILED DESCRIPTION OF THE DRAWINGS

Elements which are the same, similar or which have the same effect have been provided with the same reference symbols in the figures. The figures and the proportions of the elements shown in the figures with respect to one another should be considered as not to scale. On the contrary, individual elements may be shown in exaggerated size to improve the illustration and/or to improve understanding.

Figure 1:
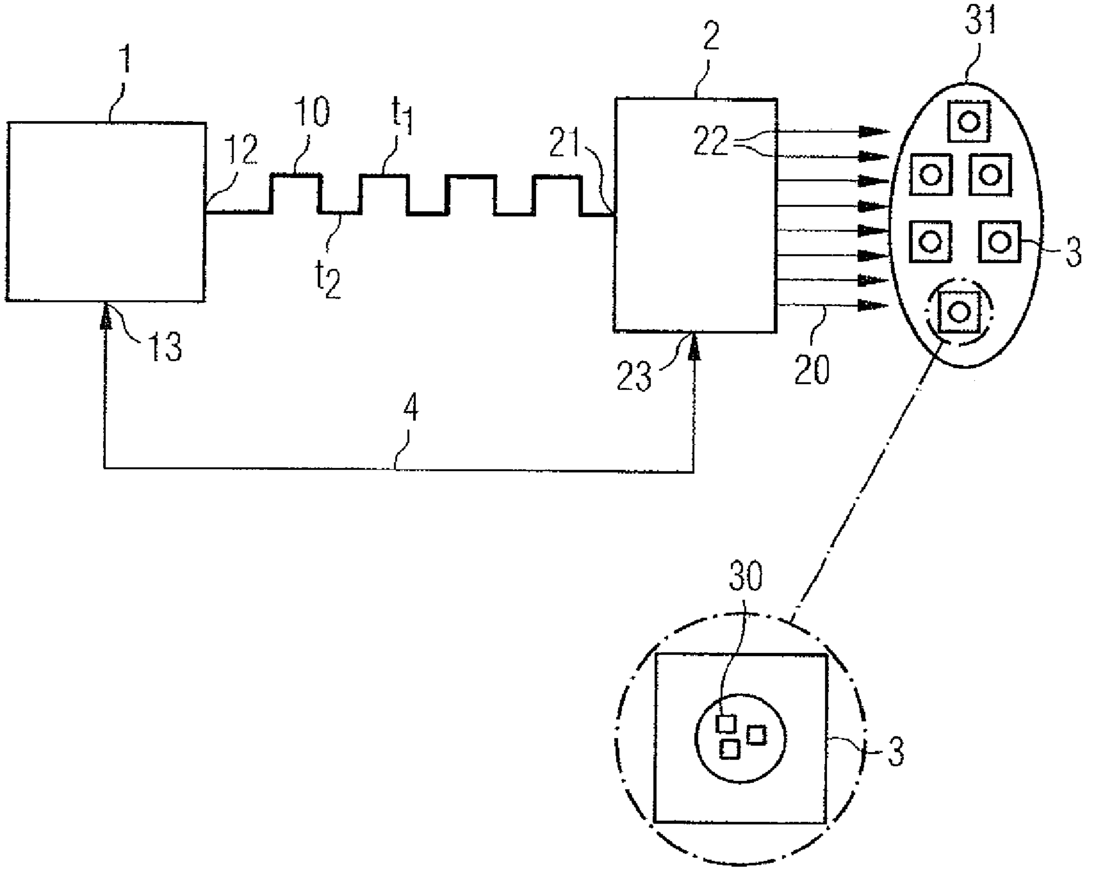
FIG. 1 is a schematic illustration to show a first embodiment of an indicator apparatus.

FIG. 1 uses a schematic illustration to show a first exemplary embodiment of an indicator apparatus as described here. The indicator apparatus comprises a pulse width modulation circuit 1. The pulse width modulation circuit 1 has a signal output 12 and a control input 13.

The pulse width modulation circuit 1 produces a pulse-width-modulated signal 10. The pulse-width-modulated signal 10 has switched-on times t1 and switched-off times t2. By way of example, the pulse-width-modulated signal 10 is produced in the manner of a square-wave pulse.

The indicator apparatus also comprises a demultiplexer 2. The demultiplexer 2 has a signal input 21. In addition, the demultiplexer 2 has a multiplicity of signal outputs 22. Finally, the demultiplexer has a control input 23.

The pulse width modulation circuit 1 and the demultiplexer 2 are connected to one another via the signal output 12 of the pulse width modulation circuit 1 and the signal input 21 of the demultiplexer 2.

In addition, the pulse width modulation circuit 1 and the demultiplexer 2 are connected by means of their control inputs 13, 23. This produces a control loop 4 between pulse width modulation circuit 1 and demultiplexer 2.

In addition, the indicator apparatus has a multiplicity of light-emitting diodes 3. In the present case, the light-emitting diodes 3 are RGB light-emitting diodes which have three light-emitting-diode chips 30, one of which produces red light, one of which produces blue light and one of which produces green light during operation. By means of the signal outputs 22, each of the light-emitting-diode chips 30 is uniquely connected to the demultiplexer 2. That is to say that the number of signal outputs 22 corresponds to three times the number of light-emitting diodes 3 in the indicator apparatus, for example.

During operation of the indicator apparatus, the pulse width modulation circuit 1 produces a pulse-width-modulated signal 10. The pulse-width-modulated signal 10 is impressed by the signal input 21 into the demultiplexer 2, which connects the pulse-width-modulated signal 10 to precisely one of its signal outputs 22, so that a connected pulse-width-modulated signal 20 is sent to one of the light-emitting-diode chips 30.

The control loop 4 synchronizes the demultiplexer 2 and the pulse width modulation circuit 1 to one another, so that the changeover from one light-emitting-diode chip 30 to the next light-emitting-diode chip 30 is in each case effected during the switched-off time t2. This prevents disagreeable flashing of the light-emitting-diode chips 30 during the changeover operation. The light-emitting-diode chips 30 are each supplied with a pulse-width-modulated signal one after the other, that is to say sequentially, in rapid succession, so that the switching is not apparent to the observer on account of the inertia of the human eye.

In contrast to the exemplary embodiment described in connection with FIG. 1, it is also possible for the pulse width modulation circuit 1 to produce a plurality of pulse-width-modulated signals 10, with the number of signals 10 corresponding to the number of light-emitting-diode chips 30 per light-emitting diode. In this way, the light-emitting-diode chips 30 of a single light-emitting diode can each be operated simultaneously, so that sequential changeover is effected not between individual light-emitting-diode chips but rather between individual light-emitting diodes.

An exemplary embodiment of an illumination apparatus as described here is explained in more detail in connection with FIG. 2.

Figure 2:
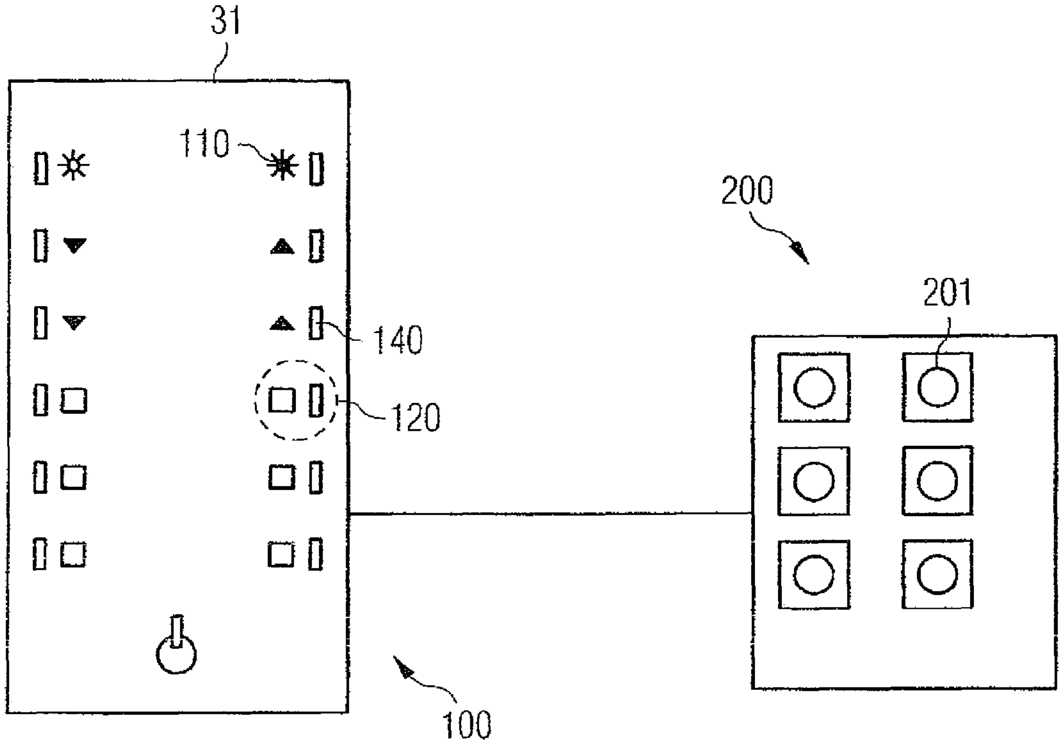
FIG. 2 shows indicator apparatus of FIG. 1 in greater detail.

FIG. 2 shows an indicator apparatus 100 as explained in more detail in connection with FIG. 1, for example. The indicator apparatus 100 comprises twelve individual light-emitting diodes 3 which are each arranged behind a viewing panel 140. The indicator apparatus comprises an operator control panel 31 on which operator control elements 120 are arranged which can be activated by touching the operator control panel 31. By way of example, the operator control panel 31 is a glass surface behind which capacitive switches are arranged in the area of the operator control elements 120. An operator control arrangement with such an operator control panel is explained in more detail in the documents DE 10 2005 059 067 A1 and DE 10 2007 017 335 A1, for example, which are hereby expressly incorporated by reference.

The indicator apparatus is connected to one or more lamps 200 which may each have a multiplicity of light-emitting diodes 201. The light-emitting diodes 3 in the indicator apparatus can be used to indicate the operating state of the lamps 200. By way of example, each operator control element may have precisely one lamp associated with it, the operating state of which is indicated by the light-emitting diode 3.

The invention is not limited to the exemplary embodiments on account of the description with reference to said exemplary embodiments. On the contrary, the invention covers any new feature and also any combination of features, which particularly includes any combination of features in the patent claims, even if said feature or said combination is itself not explicitly indicated in the patent claims or exemplary embodiments.

I claim:

1. A method for operating an indicator apparatus which has at least two light-emitting diodes, comprising the steps of:

producing a pulse-width-modulated signal, which has at least one switched-on time and at least one switched-off time, by means of a pulse width modulation circuit;

routing the pulse-width-modulated signal to a demultiplexer; and synchronizing the pulse width modulation circuit and the demultiplexer, so that the pulse-width-modulated signal is routed from the demultiplexer to one light-emitting diode of the at least two light-emitting diodes during one of the switched-off times of the pulse-width-modulated signal.

2. The method as claimed in claim 1, wherein at least one of the light-emitting diodes has at least two light-emitting-diode chips and for each light-emitting-diode chip a pulse-width-modulated signal is routed to the light-emitting diode.

3. The method as claimed in claim 1, wherein the pulse-width-modulated signal is routed from the demultiplexer sequentially to the at least two light-emitting diodes.

4. The method as claimed in claim 1, wherein the light-emitting-diode chips of the at least two light-emitting diodes are each operated at the maximum permissible current level in the switched-on time of the pulse-width-modulated signal.

5. An indicator apparatus comprising:

a pulse width modulation circuit;

a demultiplexer which has at least one signal input and at least two signal outputs, wherein the signal input is connected to the pulse width modulation circuit and the demultiplexer has more signal outputs than signal inputs; and at least two light-emitting diodes which are each connected to a signal output of the demultiplexer, wherein the at least two light-emitting diodes are supplied with operating current by the demultiplexer; and wherein, during operation of the indicator apparatus, the demultiplexer and the pulse width modulation circuit are synchronized such that a pulse-width-modulated signal produced during operation of the pulse width modulation circuit is routed from the demultiplexer to one light-emitting diode of the at least two light-emitting diodes during a switched-off time of the pulse-width-modulated signal.

6. The indicator apparatus as claimed in claim 5, wherein the demultiplexer has a control input which is connected to a control input of the pulse width modulation circuit.

7. The indicator apparatus as claimed in claim 5, wherein each light-emitting diode comprises at least two light-emitting-diode chips, wherein each light-emitting-diode chip is uniquely connected to a signal output of the demultiplexer.

8. The indicator apparatus as claimed in claim 5, having at least eight light-emitting diodes, in which the power consumption is no more than 0.5 watt.

9. An illumination apparatus comprising an indicator apparatus as claimed in claim 5, comprising at least one lamp which is connected to the indicator apparatus, wherein the indicator apparatus indicates an operating state for the at least one lamp.

10. The method as claimed in claim 1, for operating an indicator apparatus comprising:

a pulse width modulation circuit;

a demultiplexer which has at least one signal input and at least two signal outputs, wherein the signal input is connected to the pulse width modulation circuit and the demultiplexer has more signal outputs than signal inputs; and at least two light-emitting diodes which are each connected to a signal output of the demultiplexer.

11. The method as claimed in claim 1, wherein the light-emitting diodes are supplied with operating current by the demultiplexer.

12. The method as claimed in claim 1, wherein the synchronization of the pulse width modulation circuit and the demultiplexer avoids flashes of light from the light-emitting didoes.

13. The indicator apparatus as claimed in claim 5, wherein the light-emitting didoes are arranged behind a viewing panel and an operator control panel on which operator control elements are arranged, and wherein the operator control elements are configured to be activated by touching the operator control panel.

* * * * *